Oct. 30, 1928.

G. W. GRUNER 1,689,827

CHAIN HOOK

Filed Jan. 30, 1928

Inventor
G. W. Gruner
By Philip A. H. Sewell
Attorney

Patented Oct. 30, 1928.

1,689,827

UNITED STATES PATENT OFFICE.

GEORGE W. GRUNER, OF PINCKNEYVILLE, ILLINOIS.

CHAIN HOOK.

Application filed January 30, 1928. Serial No. 250,358.

The invention relates to chain hooks and contractors for automobile tire chains, and has for its object to provide a device of this character comprising a lever pivotally connected to one end of the chain and provided with a link receiving recess adjacent its pivotal point, which lever is adapted to be passed through the link of the other end of the chain for connecting the chain together, and which lever when pivotally moved contracts the chain. Also to provide the free end of the lever with a hook adapted to hook over one side of a chain link for holding the lever in operated position, and a removable pin extending through said hook, and forming means for positively maintaining the hook in engagement with said link.

A further object is to provide a chain fastener and tightener pivotally connected to a chain end, and which fastener when passed through a link of the other chain end will remain in engagement with said last named link for allowing adjustment and arrangement of the chain before pivotal movement of the tightener for tightening the chain.

A further object is to provide a tire chain connector and tightener which is provided with means which will positively prevent accidental loosening thereof, thereby obviating the difficulty now experienced with devices of this general character.

A further object is to provide the ends of one of the end links with loops extending around a pin of the lever, and which loops terminate in arms at opposite sides of the recess, thereby limiting any upward movement of the link of the other end of the chain when in the recess.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
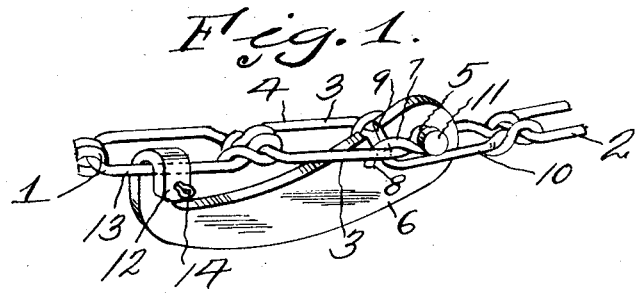
Figure 1 is a perspective view of the chain hook.
Figure 2:
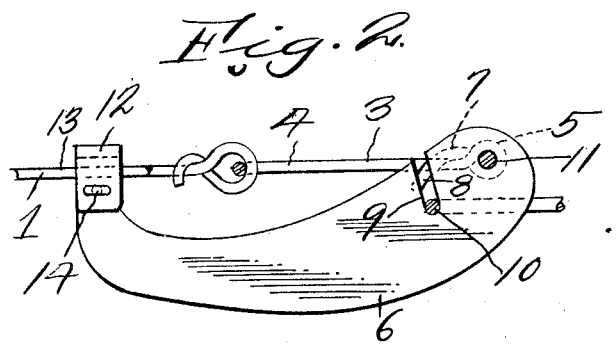
Figure 2 is a side elevation of the chain hook with parts of the chain in longitudinal section to better show the structure.
Figure 3:
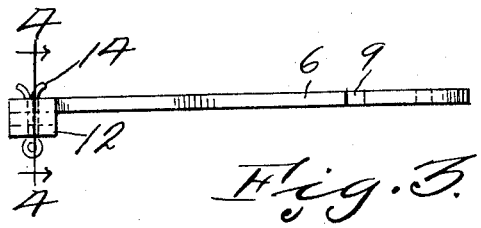
Figure 3 is a top plan view of the hook.

Referring to the drawing, the numeral 1 designates one of the chain ends and 2 the other chain end. The opposite sides 3 of the link 4, carried by the chain end 1 are bent to provide loops 5, which loops are at opposite sides of the pivoted member 6 and terminate in ends 7 twisted around the sides 3 and extending downwardly at 8 relatively close to the opposite sides of the recess 9, and which members 8 form means for preventing excessive upward movement of the link 10, when in the recess 9, and which link is carried by the chain end 2.

Figure 4:
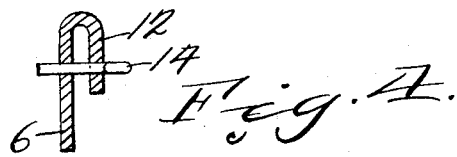
Figure 4 is a vertical transverse sectional view through the hook taken on line 4—4 of Figure 3.

When applying the device the pin 11 is placed through the ends of the sides 3 of the link 4, and through the end of the lever 6, and the pin is preferably a permanent member having its end riveted. When it is desired to connect the chain ends 1 and 2, the lever 6 is passed through the link 10 of the chain end 2, and it will be seen that when the link 10 is in the recess 9, the chain ends will be connected, even though the lever is not moved to the position shown in Figure 1 for tightening purposes, consequently the tire chain as a whole can be easily adjusted, kinks taken out of the same and other tighteners adjusted before the tightening operation, without the chain ends coming out of connected relation. After proper adjustment of the chain, the lever 6 is pivotally moved which will draw the chain ends towards each other, then the hook 12 is passed over one side of the chain link 13 as clearly shown in Figure 1, which will maintain the lever in operated position. To positively prevent unhooking of the lever a cotter pin 14 is provided, which cotter pin extends through the hook as clearly shown in Figure 4 below the link 13, consequently the lever is positively held in closed position at all times, and danger of disengagement of the hooked end is obviated, which is the common difficulty now experienced with devices of this general character.

From the above it will be seen that a chain hook is provided, which is simple in construction, may be cheaply manufactured and sold, consists of a single piece of material which may be stamped, will positively hold the chain ends in connected relation before the tightening operation. It will also be seen by providing the hook 12 and the cotter pin 14, the lever will be positively maintained in operative position.

The invention having been set forth what is claimed as new and useful is:

The combination with a chain tightener comprising a lever carried by a chain end and adapted to be passed through a link of another chain end for receiving said last named link in a recess adjacent its pivotal point, of eyes carried by opposite sides of a link, a pivot pin extending through said eyes and lever, said eyes terminating in members twisted around the link sides and terminating at opposite sides of the recess in arms registering with the recess and forming means for preventing excessive movement of the link in the recess and maintaining the link in the recess.

In testimony whereof I hereunto affix my signature.

GEORGE W. GRUNER.